C. F. M. VAN BERKEL.
SLICING MACHINE.
APPLICATION FILED MAR. 8, 1919.
1,339,590.
Patented May 11, 1920.
3 SHEETS—SHEET 3.
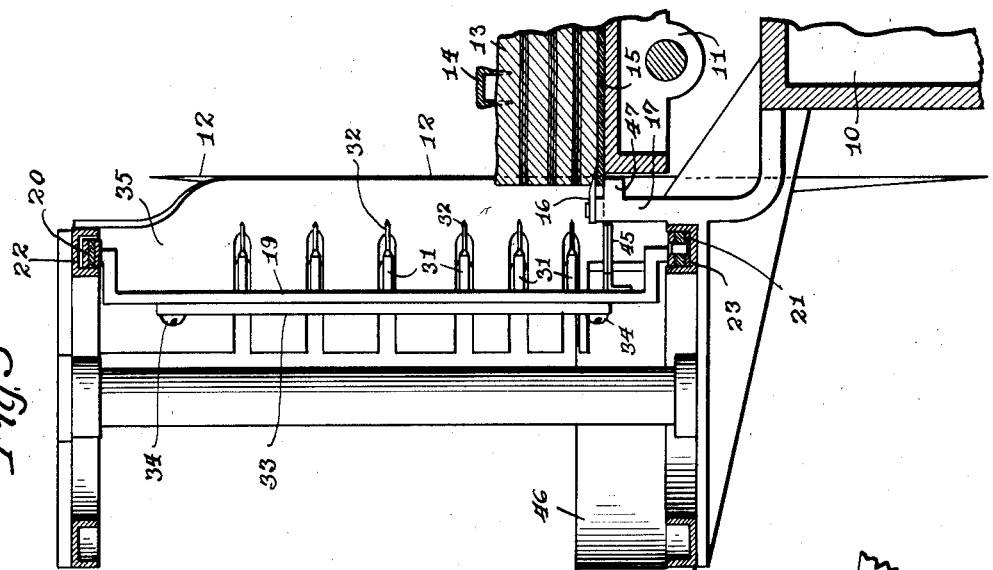
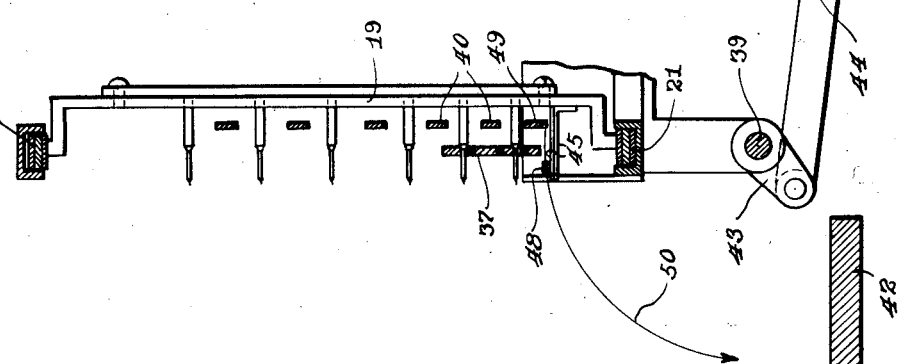
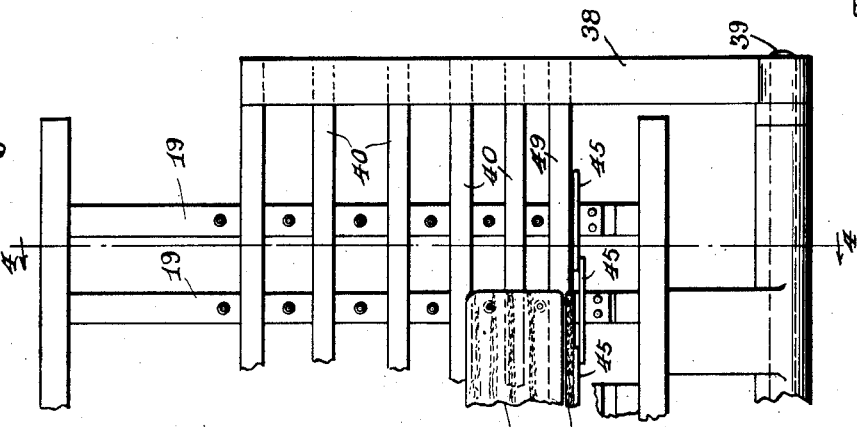
Witness:
L.B. Graham
Inventor:
Cornelis F.M. van Berkel
By Brown & Nissen
Attys.

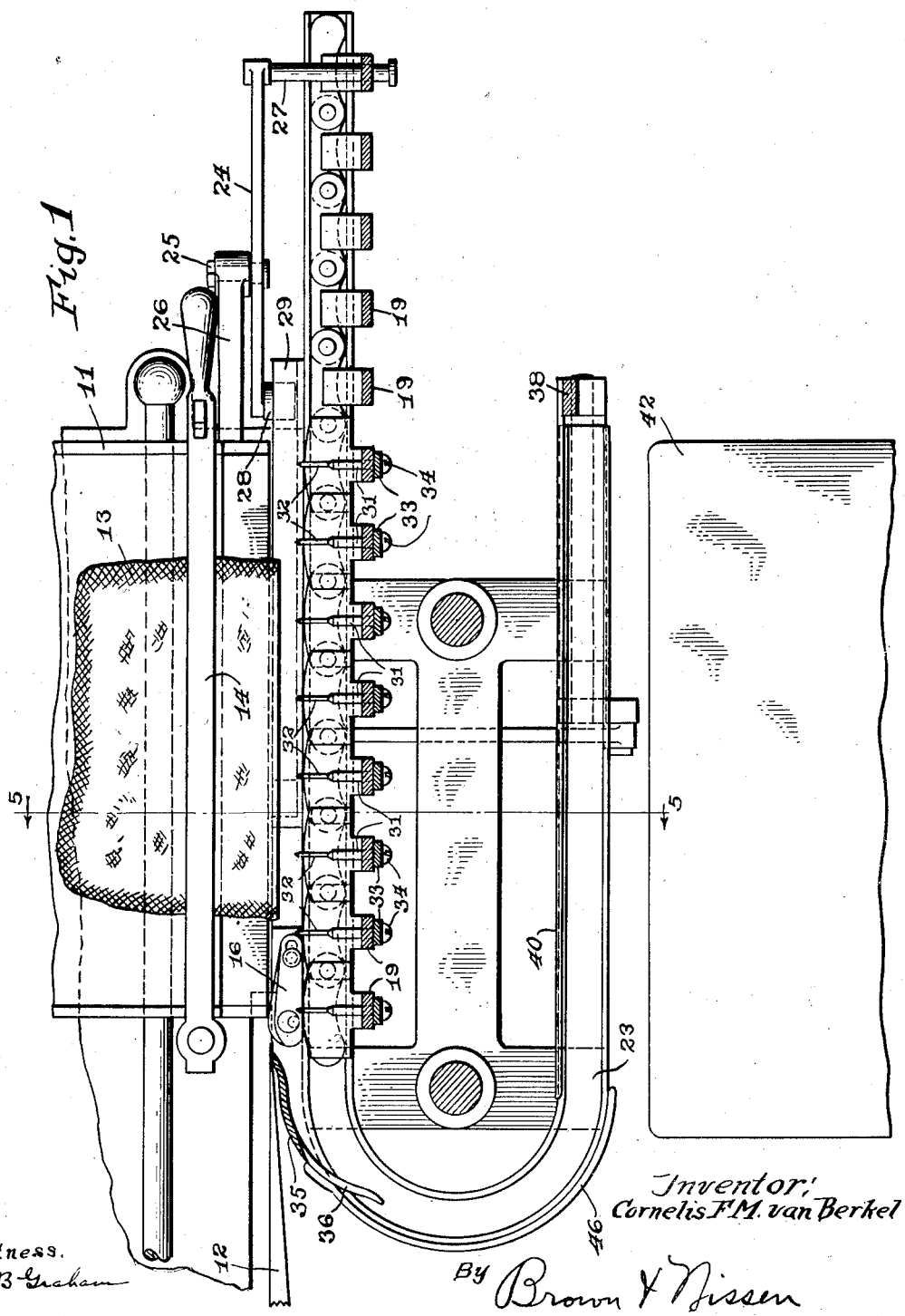

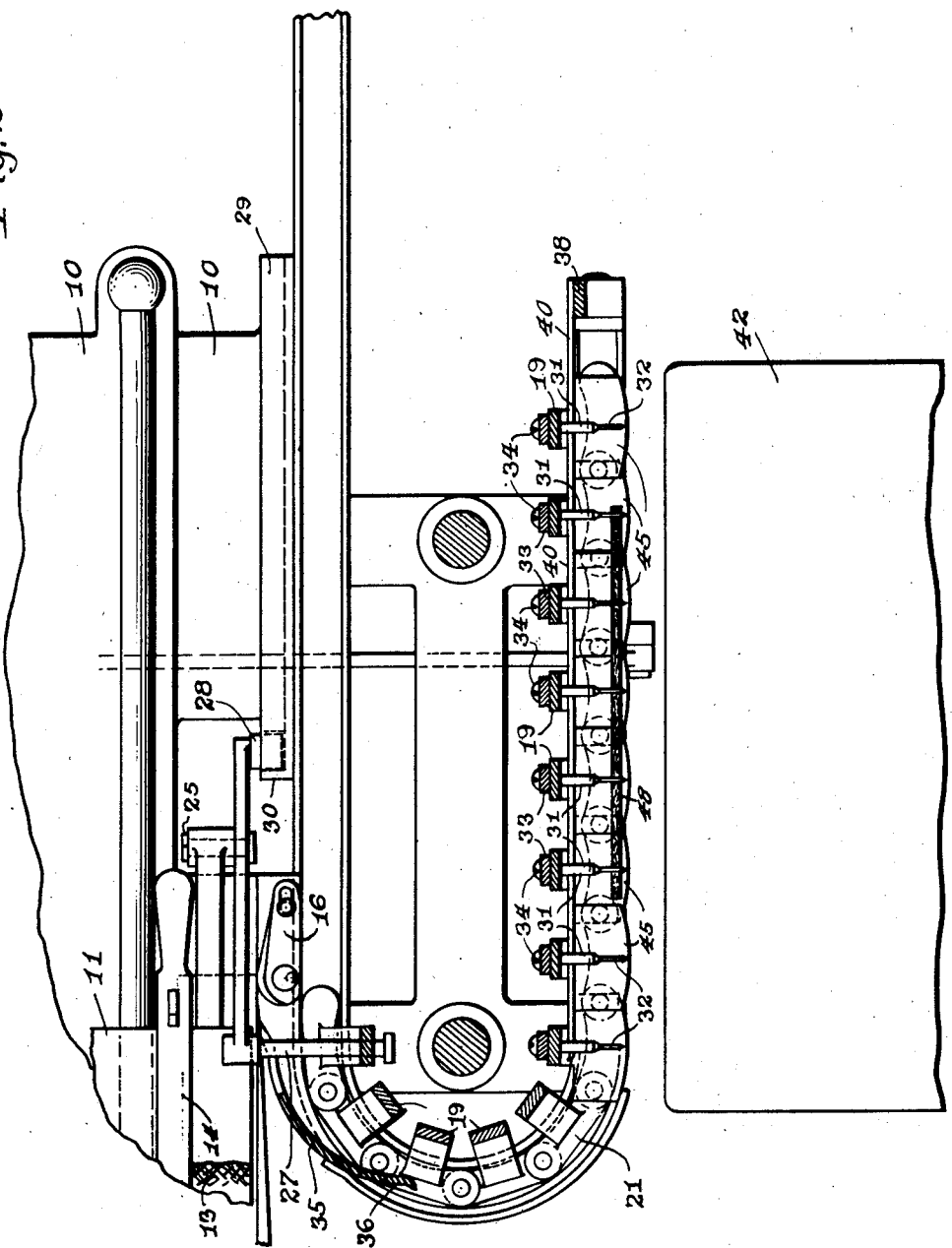

UNITED STATES PATENT OFFICE.

CORNELIS F. M. van BERKEL, OF ROTTERDAM, NETHERLANDS, ASSIGNOR TO U. S. SLICING MACHINE COMPANY, OF LAPORTE, INDIANA, A CORPORATION OF INDIANA.

SLICING-MACHINE.

1,339,590.  Specification of Letters Patent.  Patented May 11, 1920.

Application filed March 8, 1919. Serial No. 281,337.

*To all whom it may concern:*

Be it known that I, CORNELIS F. M. VAN BERKEL, a subject of the Queen of the Netherlands, residing at Rotterdam, Netherlands, have invented certain new and useful Improvements in Slicing-Machines, of which the following is a specification.

The object of the invention is to provide a machine of the class named which shall be of improved construction and operation. The invention is exemplified in the combination and arrangement of parts shown in the accompanying drawings and described in the following specification, and it is more particularly pointed out in the appended claims.

In the drawings—Figure 1 is a fragmentary top plan view of a slicing machine embodying the present invention, parts of the machine being shown in section; Fig. 2 is a view similar to Fig. 1 showing certain of the parts in a different position; Fig. 3 is a fragmentary elevational view showing a portion of the fly and associated parts which constitute a part of the present invention; Fig. 4 is a vertical sectional view on line 4—4 of Fig. 3; and Fig. 5 is a vertical sectional view on line 5—5 of Fig. 1.

This invention is especially applicable to a slicing machine provided with a stacker similar to that shown in my application Ser. No. 178,734.

In the drawings, the numeral 10 designates the base of a slicing machine of well-known form, which is provided with a reciprocating meat table 11 and a rotary disk slicing knife 12. The table 11 is reciprocated by mechanism well-known in the art, in a direction parallel with the cutting plane of the knife to present material carried upon the table to the cutting edge of the knife which severs the slices therefrom. In the drawing, a piece of meat, such as bacon, is represented at 13 and is clamped on the reciprocating carriage 11 by a clamp 14 in the usual manner. The rind 15 of the meat is placed so that it rests upon the upper surface of the table 11. The usual mechanism, not shown, is provided for feeding the meat in a direction transverse to the plane of the slicing knife after each slice has been cut. A rind removing knife 16 is adjustably mounted on a support 17 in position to enter between the meat and the rind as the slices are formed and sever the rind from a portion of the meat preparatory to the slicing operation.

Mechanism is provided for receiving the slices severed from the piece of meat and for depositing the slices in a stack of regular formation, which mechanism includes a series of upright bars 19 which bars are provided at their upper and lower ends respectively with pivotally connected links 20 and 21. The links 20 and 21 are arranged to travel in channel shaped guideways 22 and 23 respectively, which are curved outwardly and rearwardly, as shown in Figs. 1 and 2, and which guide the links around a curve of 180° at the portion of their path of travel adjacent the knife 12 and thus cause the links to assume the position shown in Fig. 2 at the end of a slicing operation. The links are caused to slide within their guideways by means of a lever 24 pivotally connected at 25 to an arm 26 carried upon the meat table 11. The upper end of the arm 24 is provided with an outwardly projecting pin 27 which extends through a vertical slot in the rearmost upright bar 19. The lower end of the lever 24 is provided with a roller 28 which travels in a channel guide 29 rigidly secured to the frame of the machine. The channel guide 29 is curved downwardly at its end adjacent the slicing knife to form a stop for the roller 28, as shown at 30 in Fig. 2 of the drawing. By this arrangement, the upright bars 19 are caused to travel in unison with the reciprocating table 11 during the first portion of the movement of the table, but are given an accelerated movement as the table approaches the end of its reciprocation, due to the fact that the roller 28 is retarded while the pivotal support 25 for the lever continues to move forwardly. This, of course, will impart an increased speed to the pin 27 and throw it forwardly into the position shown in Fig. 2, thus moving the bars 19 around the curve in their guides 22 and 23 and into the position shown in Fig. 2.

The bars 19, as shown in Figs. 4 and 5, are offset inwardly out of the plane of their guides and are provided with a series of prongs or spikes 31, the points 32 of which project outwardly from the bars into approximate alinement with the pivotal connection between the links 20 and 21. By this arrangement, the points 32 of the spikes 31 are caused to maintain a uniform distance from one another as they pass around the curve in their guides. The object of this is to prevent stretching of the slice held upon the points of the prongs during the movement around this curve. It should be noted that the main body of the prongs 31 is comparatively heavy, to provide sufficient strength, but that the slice engaging portions 32 are of small diameter so that they will easily pierce the slices to be supported and so that the openings which they form in the slice will be so small that they will not be noticeable. The portions 32 which enter the slice, are not tapered, but are straight cylinders so that there will be no tendency of the slices to slide off the points of the prongs while they are being carried around the curve in their path of movement. All of the prongs 31 for any particular bar 19, are mounted upon a supplemental supporting strip 33 which is removably secured to the rear of the bar 19 by screws 34. The prongs 31 project through openings in the bars 19 provided for this purpose. This arrangement permits easy removal of broken or damaged prongs and their replacement by new ones. It also makes it possible to provide the user of the machine with extra prongs which may be easily applied without the necessity of obtaining the services of an expert mechanic or of sending to the factory.

The parts of the machine may be so proportioned that the points of the prongs 31 will enter the material before it is sliced, but in the drawing the points of the prongs are shown as being spaced slightly away from the face of the material being cut, and a guard 35 is secured to the frame of the machine adjacent the cutting edge of the knife which engages the slice after it has been severed and deflects it inwardly into engagement with the points of the prongs 31. The guard 35 is provided with a series of slots 36 in which the points of the prongs travel as they pass around the curve in their path of movement, thus causing the prongs to penetrate through the slice in such a way that the slice is supported upon the prongs. In this way the slice is carried around the curves formed by the guides 22 and 23 and is brought into the position indicated at 37 in Figs. 2, 3, and 4 of the drawing. In order to discharge the slice from the prongs, a fly 38 is pivoted at 39 upon the frame of the machine and is provided with a series of fingers 40 which enter between the prongs 31 in the rear of the slice as the slice is moved into the position shown in the figures referred to. At the time that the slice-carrier comes to a stop at the end of its movement, the fly 38 is swung outwardly and downwardly about its pivot 39 and thus the fingers 40 are caused to engage the slice 37 and to strip the slice from the points of the finger 31 and finally discharge the slice broad side down upon a receiving table 42. The pivotal movement of the fly 38 is imparted to it by an arm 43 secured to the pivot pin 39 and connected by means of a link 44 to cam mechanism, not shown, but which is driven by the main driving shaft of the slicing machine in timed relation with the movement of the other parts, so that the fly is caused to swing outwardly at the proper period in the cycle of operation of the machine.

The strips of rind as they are severed from the main body if uncared for, would accumulate below the knife where they are severed, and thus interfere with the operation and also leave the rind separated from the slices, thus detracting from the weight of the material delivered to the customer. It is usual in selling bacon to a customer to include the rind with the sliced meat and for this reason it is desirable to provide means to transfer the strips of rind to the receiving table 42 for the bacon slices. To do this the uprights 19 which carry the pins 31, are each provided with a projecting shelf 45 extending from the uprights in the same direction as the pins 31 but positioned just below the plane of the upper surface of the meat table 11. These projecting shelves, as shown in Fig. 3, have their edges arranged to overlap one another, the alternate shelves differing slightly in their vertical position to permit of such overlapping arrangement. The series of shelves form a continuous ledge for receiving the strips of rind and a guard plate 46 is secured to the outer periphery of the curved portion of the lower guide 23 and is positioned adjacent the outer edges of the shelves 45 as they pass around the curve in their path of movement. The strips of rind are deflected inwardly onto the shelves 45 by the guard plate 35 in the same way that the slices are deflected into engagement with the prongs 31, and the strips of rind are held from falling from the edges of the plates 45 as they pass around the curve by the guard plate 46. It will be seen from Fig. 5 that a projection 47 on the rind remover bracket 17 extends beneath the portion of the meat that is being sliced, and this projection is extended forwardly a sufficient distance to prevent downward movement of the strips of rind until they are deposited on the rind carrying plates 45. After a strip of rind has been guided about the curve in the path of movement of the slice carrier by the mechanism described, it will lie upon the edges of the plates 45 in the position indicated at 48 in Fig. 4 of the drawing. This is the position it occupies at the time the slice is discharged from the carrier and a supplemental finger 49 is carried by the fly 38 in such a position that the rotary movement of the fly will cause the lower edge of the finger 49 to travel in an arc indicated by the arrow 50 in Fig. 4 of the drawing. The radius of this arc is just sufficient to cause the lower edge of the finger 49 to miss the outer edges of the projecting shelves 45 and this will bring the finger into contact with the strip of rind resting upon the upper surface of these shelves and thus carry the rind outwardly and downwardly and deposit it upon the table 42 in a position at one edge of the slice which is deposited at the same time. In this way, not only the slices are arranged in an orderly stack upon the table, but the strips of rind cut from the slices are also deposited in a little pile at one side of the stack of slices, so that the whole may be wrapped together and sold to a customer, or the slices may be wrapped separately, if it is so desired.

I claim:

1. The combination with mechanism for severing slices from a piece of meat, of means for removing the rind from said slices, means for depositing the slices in stack formation, and means for collecting the rind removed from said slices.

2. The combination with a slicing machine, of mechanism for depositing the slices formed by said machine in stack formation upon a receiving platform, means for severing the rind from the slices during the slicing operation, and means for depositing the severed rind upon said platform with said slices.

3. The combination with a slicing machine, of means for severing the rind from material being sliced, and a movable conveyer for receiving said rind and transferring it to a position removed from the slicing position.

4. In combination, a slicing machine, means for removing the rind from the material being sliced, and a conveyer for receiving the slices formed by said machine and the rind removed from said slices, and for transferring said slices and rind away from the position in which they are severed from said material.

5. The combination with a slicing machine and a rind remover therefor, of a movable receiver for the rind severed by said rind remover, and means for directing the rind onto said receiver.

6. The combination with a sliding machine having a slicing knife and a rinding knife, of a movable conveyer for transferring the slices away from said slicing knife, and movable means for conveying the rind away from said rinding knife.

7. The combination with a slicing machine and a rinding knife therefor, of a movable platform having a path of travel adjacent said rinding knife, and means for directing the rind severed by said rinding knife onto said platform.

8. The combination with a slicing machine having a rind remover thereon, of a conveyer for receiving the rind severed by said rind remover, mechanism for operating said conveyer to transfer the rind received thereby to a position away from said rind remover, and means for discharging the rind from said conveyer while in said position.

9. The combination with a slicing machine having a slicing knife and a rind remover, of a conveyer having a path of travel adjacent said rind remover, means for directing the rind severed by said rind remover onto said conveyer, means for operating said conveyer to transfer said rind away from said slicing knife and rind remover, and means for discharging said rind from said conveyer while in its removed position.

10. In combination, a slicing machine having a slicing knife and a rind remover, a conveyer for receiving slices formed by said slicing knife, means for receiving the rind severed by said rind remover, mechanism for operating said conveyer and rind receiver to transfer said slice and rind to a position removed from said slicing knife and rind remover, and means for discharging said slice and rind from said conveyer and rind receiver while said slice and rind are in their removed positions.

11. The combination with mechanism for severing slices from a piece of material and removing the rind therefrom, of means for depositing said slices and rind in adjacent piles upon a receiving platform.

12. The combination with mechanism for severing slices from a piece of material and for removing the rind from said slices, of a platform for receiving said slices, and means for depositing the rind severed from said slices upon said platform.

13. The combination with a slicing machine having a slicing knife and a rind remover, of a conveyer for receiving the slices formed by said slicing knife, and means carried by said conveyer and movable therewith for receiving the rind severed from said slices by said rind remover.

14. The combination with a slicing machine having a rind remover thereon, of a conveyer for receiving strips of rind severed by said rind remover, said conveyer comprising a series of relatively movable plates and means for operating said conveyer to transfer the slices upon said plates to a position removed from said rind remover.

15. The combination with a slicing machine and a rind remover therefor, of a conveyer comprising a series of upright members pivotally connected with one another, horizontally extending members carried by said upright members for receiving the rind severed by said rind remover means for directing said rind upon said horizontally extending members, and means for moving said upright members to transfer said rind to a position removed from said rind remover.

16. The combination with a slicing machine having a slicing knife and a rind remover, of a conveyer comprising a series of upright bars movably connected with one another, pins on said bars for receiving slices formed by said slicing knife, and a series of horizontally projecting members carried by said bars for receiving the rind severed from said slices by said rind remover.

17. In combination with a slicing machine having a slicing knife and a rind remover, a conveyer comprising prongs for receiving the slices formed by said slicing knife, and horizontally extending supports for receiving the rind severed from said slices, and mechanism for discharging said slices and rind from said conveyer.

18. The combination with a slicing machine, of a rind remover therefor, a movable conveyer for receiving the rind severed by said rind remover, and a deflector for directing the rind onto said movable conveyer.

19. The combination with a slicing machine having a rind remover therefor, of a horizontally movable conveyer, a deflector for directing the rind severed by said rind remover onto said conveyer, means for causing said conveyer to travel in a curved path, a guard plate for preventing the escape of the rind from said conveyer during movement of said conveyer in said curved path, and means for discharging the rind from said conveyer.

20. The combination with a slicing machine having a slicing knife and a rind remover, of a conveyer comprising a series of upright bars having horizontally projecting prongs thereon for engaging the slices formed by said slicing knife, a series of horizontally projecting plates carried by said upright bars in overlapping relation relatively to one another, a deflector for directing the rind severed by said rind remover onto said plates, means for moving said conveyer to transfer the slices and rind carried thereby to a position removed from said slicing knife, and a device for discharging said slices and rind from said conveyer.

21. The combination with a slicing machine comprising a slicing knife and a rind remover, of a conveyer comprising a series of horizontally extending supports having a path of movement adjacent said rind remover, means for directing the rind severed by said remover onto said supports, means for operating said conveyer to transfer the rind on said supports to a position removed from said rind remover, a discharge device having an arm arranged to enter a position above said supports when said conveyer is brought into discharge position, and means for operating said arm to engage the rind upon said supports and discharge said rind from said supports.

22. The combination with a slicing machine having a slicing knife and a rind remover, of a conveyer comprising a series of upright bars movably linked with one another, prongs projecting from said bars for impaling the slices formed by said slicing knife, rind receiving members extending from said bars, a deflector for directing strips of rind severed by said rind remover onto said rind receiver, means for operating said conveyer to transfer the slices and strips of rind carried thereby to a position removed from said slicing knife and rind remover, and a fly having a series of arms arranged to enter between said prongs and rind receivers in the rear of the material carried thereby, and means for operating said fly to cause said arms to engage slices and strips of rind carried by said conveyer and to discharge said slices and rind from said conveyer.

23. The combination with a slicing machine, of means for receiving slices therefrom comprising prongs having main body portions with slice-carrying points thereon of less diameter than said body portions for entering said slices, said slice-carrying points being of substantially uniform diameter throughout their length.

24. The combination with a slicing machine, of a device for receiving slices therefrom comprising prongs having main body portions with slice-carrying points thereon for impaling said slices, said points being of smaller diameter than the body of said prongs and of substantially uniform cross-section throughout the slice-carrying portion thereof.

25. The combination with a slicing machine, of a device for receiving slices therefrom comprising a plurality of prongs for engaging said slices, and means for detachably securing said prongs to said slice receiver in units each of which units includes a plurality of said prongs.

26. The combination with a slicing machine, of a device for receiving slices therefrom, prongs for engaging said slices and a series of detachable means for supporting said prongs, each of said supporting means having a plurality of prongs secured thereto and being detachably secured to the slice receiving device.

27. The combination with a slicing machine, of a receiver for slices formed by said machine, prongs for said receiver, and means for detachably securing said prongs to said receiver in units, each of which units comprises a plurality of said prongs.

28. The combination with a slicing machine, of a receiver for slices formed by said machine, said receiver comprising a plurality of conveyer bars, prong supporting bars detachably secured to said conveyer bars, and a plurality of prongs mounted upon each of said prong supporting bars.

29. The combination with a slicing machine, of means for receiving slices therefrom, said receiving means comprising a plurality of upright conveyer bars having openings therethrough, prong supporting bars detachably secured to said conveyer bars, prongs carried by said prong supporting bars and extending through the openings in said conveyer bars, said prongs having reduced extensions on the ends thereof of substantially uniform cross section throughout their length, for penetrating the slices formed by said slicing machine.

In testimony whereof I have signed my name to this specification on this 21st day of December, A. D. 1918.

C. F. M. van BERKEL.